United States Patent Office 3,443,471
Patented May 13, 1969

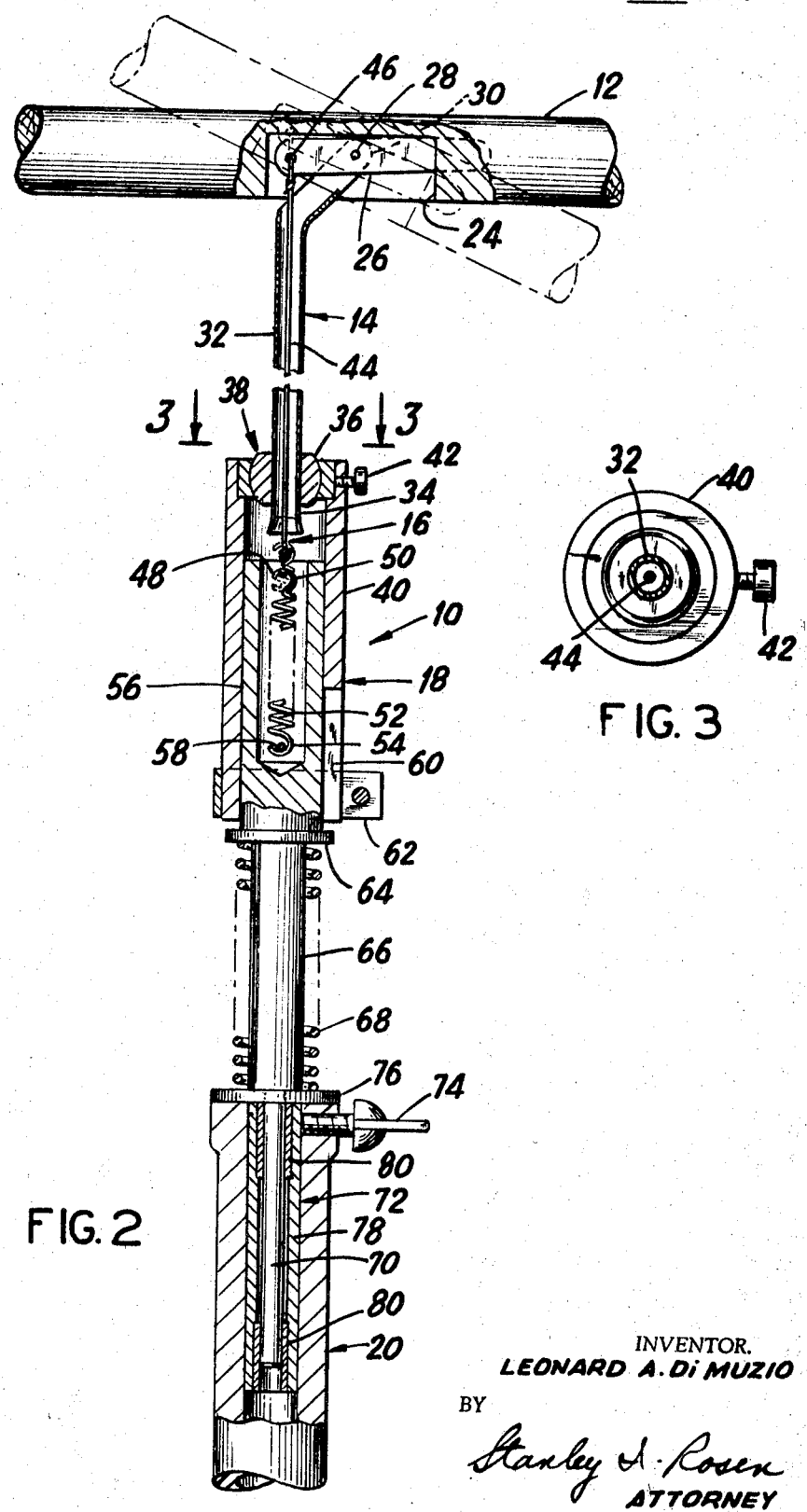

3,443,471
FINGER AND WRIST DEVELOPER
Leonard A. Di Muzio, 307 Pearl St.,
Cambridge, Mass. 02138
Filed Nov. 6, 1967, Ser. No. 680,819
Int. Cl. G09b 15/06
U.S. Cl. 84—465                                       9 Claims

ABSTRACT OF THE DISCLOSURE

The finger and wrist developer disclosed herein is intended for use by a beginner drummed to develop finger and wrist control of the drum stick, and comprises a drum stick, means pivotally mounting the drum stick, and means for biasing the drum stick toward an upwardly inclined position, whereby repetitive downwardly applied forces by the fingers of the drummer causes pivotal up and down movement of the drum stick. The finger and wrist developer is also useful by the professional drummer to provide concentrated development of the fingers and wrist.

BACKGROUND OF THE INVENTION

*Field of the invention*

The invention relates to musical instruments and, more particularly, to a finger and wrist developer for the drum stick.

*Description of prior art*

The beginner on the drums learns proper finger and wrist control by going through repetitive practice exercises on a drum or drum pad with a drum stick without the aid of any devices which restrain or control the drummer's finger and wrist motions. The learning process is thereby unaided.

SUMMARY OF THE INVENTION

Briefly described, the present invention provides a finger and wrist developer for the drum stick which comprises a drum stick, means mounting the drum stick for pivotal up and down movement, and means for biasing the drum stick into an upwardly inclined position.

The drum stick pivotal mounting means comprises a hollow tube whose upper end is pivotally connected to the drum stick and which extends downwardly therefrom into the upper end of a support for mounting the developer on the upper end of a music stand.

The drum stick biasing means comprises a tension spring mounted in the support. A cable is connected to the upper end of the spring, extends upwardly through the hollow tube and is fixed to the drum stick rearwardly of the pivotal connection of the hollow tube to the drum stick thereby biasing the drum stick into an upwardly inclined position. The support includes means to adjust the tension of the spring.

BRIEF DESCRIPTION OF THE DRAWING

FIG. 2 is an elevation view, partly in section, of the developer; and

FIG. 3 is a cross section taken on line 3—3 of FIG. 2.

DESCRIPTION OF THE PREFERRED EMBODIMENT

Figure 1:
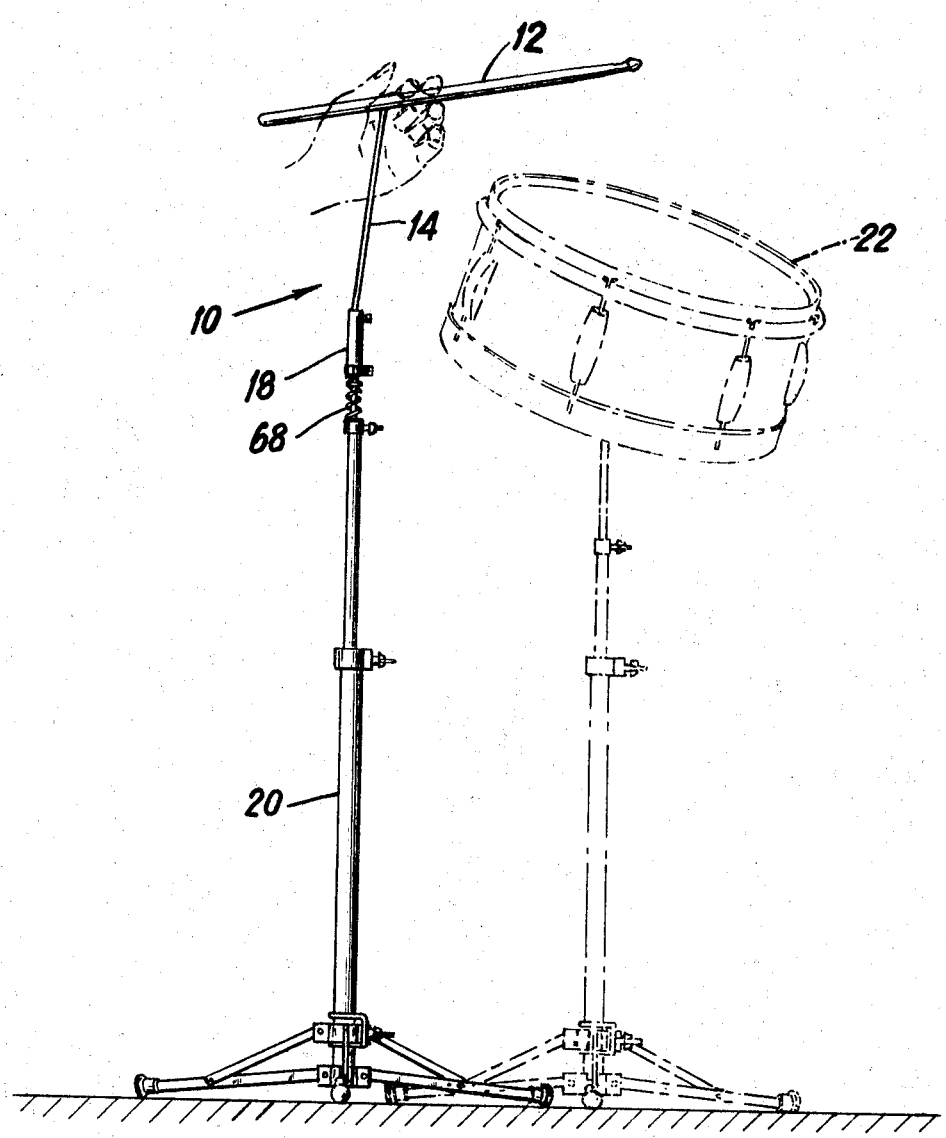
FIG. 1 is an elevation view of the finger and wrist developer of the present invention mounted on a music stand.

The finger and wrist developer 10 comprises, a drum stick 12, a pivotal support 14 for the drum stick, biasing means 16 for biasing the drum stick into an upwardly inclined position and a support 18 for mounting the developer on the end of a music stand 20. The developer is so constructed that downward finger and wrist pressure on the upper side of the drum stick causes the drum stick to pivot downward toward drum 22 with the proper movement. Release of the pressure causes the drum stick to pivot upwardly into its original position, also with the proper movement. The drum stick is constrained for proper pivotal movements only so that the beginner drummer consequently learns more easily the proper finger and wrist control for obtaining proper movement of the drum stick.

The drum stick includes an elongated slot 24 in its underside and one end of a lever 26 extends into the slot, the other end of the lever extending into the drum stick and being fixed thereto. A stationary pivot pin 28 extends through the drum stick, across the slot and through the lever. The bifurcated upper end 30 of a hollow tube 32 of support 14 straddles lever 26 and is pivotally mounted on pin 28. End 30 extends downwardly from slot 24 and is laterally offset, as shown, from the remaining lower portion of tube 32. Lower end 34 of the tube is fixed to a ball 36 of a ball and socket joint 38 which is mounted in the upper end of a hollow sleeve 40 of support 18 so that the lower end of the tube is supported for universal movement. Joint 38 is locked in place by screw 42.

A cable 44 of biasing means 16 extends through hollow tube 32 and the upper end 46 of the cable is fixed to lever 26 rearwardly of pivot 28. Lower end 48 of the cable extends below tube 32 and is fixed to the upper end 50 of a tension spring 52. Spring 52 extends through the hollow portion of the upper end of a rod 56 which is mounted for relative sliding movement within sleeve 40. A pin 58 extends through the hollow portion of rod 56 and the lower end of the tension spring is affixed thereto. Sleeve 40 is provided with a vertical slot 60 so that it can be tightened about rod 56 by clamp 62 to fix the relative positions of the sleeve and rod and thereby provide the necessary tension on the spring.

The lower end of the rod is provided with a shoulder 64 and a smaller rod portion 66 extends downward therefrom. A compression spring 68 surrounds rod portion 66 and provides a cushion for support 18 on music stand 20. The lower end of portion 66 is provided with another rod portion 70 which extends into a bearing assembly 72 which is locked into position in the hollow upper end of music stand 20 by a screw 74. The bearing assembly includes an upper shoulder portion 76 which rests on top of the music stand and is part of hollow sleeve 78 in which bearings 80 are fitted. The bearing assembly permits rotational movement of the developer 10 about the vertical axis of the music stand.

The normal position of the developer is the upwardly inclined position of the drum stick caused by spring tension on lever 26 at cable end 46. The tension can be increased by loosening clamp 62 and elongating spring 52 by pulling down on rod 56.

The beginner drummer operates the developer by placing the fingers of the hand on the drum stick in the position shown in FIG. 1 and exerting finger pressure downwardly against the drum stick causing the end of the drum stick to move toward drum 22. Release of finger pressure causes the drum stick to return automatically to its upwardly inclined position.

I claim:
1. Finger and wrist developer comprising, a drum stick, means pivotally mounting said drum stick for pivotal up and down movement, and means connected to said drum stick for biasing said drum stick toward an upwardly inclined position, whereby repetitive downwardly applied forces by the fingers of the drummer causes said pivotal up and down movement of said drum stick.
2. A finger and wrist developer as defined in claim 1, wherein said pivital mounting means comprises an elongated member extending downwardly from said drum stick, and mounting means connected to the lower end of said elongated member for mounting said member in the upper end of a music stand.

3. A finger and wrist developer as defined in claim 2, wherein said elongated member is a hollow tube, and said biasing means comprises a cable extending through said tube member and pivitally connected at its upper end to said drum stick in spaced relation to said connection of said tube to said drum stick, a tension spring connected at its upper end to the lower end of said cable, and means connecting the lower end of said spring to said last mentioned mounting means.

4. A finger and wrist develiper as defined in claim 3, said last mentioned mounting means comprising a hollow sleeve, a rod mounted for relative longitudinally movement within said sleeve and having a hollow upper part, said spring connecting means extending through said rod for connecting said spring thereto and within said hollow upper part, and means to tighten said sleeve about said rod.

5. A finger and wrist developer as defined in claim 4, said rod having a lower elongated part for extending into the upper hollow part if a music stand for mounting thereon.

6. A finger and wrist developer as defined in claim 5, and a compression spring surrounding said lower elongated part of said rod to provide a spring cushion for supporting said developer on said music stand.

7. A finger and wrist developer as defined in claim 1, wherein said drum stick has a longitudinally extending slot in its underside, and said drum stick pivotal mounting means comprises a pivot pin extending through said slot and an elongated member pivotally connected at its upper end to said pin and extending downwardly therefrom through said slot below said drum stick.

8. A finger and wrist developer as defined in claim 7, wherein a lever is fixed within said slot, said elongated member being a hollow tube, said biasing means comprising a cable extending through said hollow tube and connected at its upper end to said lever, a tension spring connected to the lower end of said cable, and means connected to said spring for mounting said developer on a music stand.

9. A finger and wrist developer as defined in claim 8, wherein said hollow tube has a ball and socket joint at its lower end mounted in the upper end of said developer mounting means.

References Cited
UNITED STATES PATENTS

| | | | |
|---|---|---|---|
| 2,202,202 | 5/1940 | Hesse | 84—465 |
| 3,341,196 | 9/1967 | Perretta | 272—67 |

RICHARD B. WILKINSON, *Primary Examiner.*

LAWRENCE R. FRANKLIN, *Assistant Examiner.*

U.S. Cl. X.R.

272—67